May 28, 1957 J. R. HOLMES 2,793,836
HEATER CONSTRUCTION
Filed Dec. 28, 1953 2 Sheets-Sheet 1

Inventor
John Ralph Holmes
By C. H. Dilbe
Attorneys

May 28, 1957

J. R. HOLMES 2,793,836

HEATER CONSTRUCTION

Filed Dec. 28, 1953

Inventor
John Ralph Holmes

Attorneys

United States Patent Office 2,793,836
Patented May 28, 1957

2,793,836

HEATER CONSTRUCTION

John Ralph Holmes, Lockport, N. Y., assignor to General Motors Corporation, Detroit, Mich., a corporation of Delaware Application December 28, 1953, Serial No. 400,558

6 Claims. (Cl. 257—241)

This invention relates to vehicle heaters and more particularly to vehicle heaters utilizing engine exhaust gases.

While hot water heaters have for many years constituted the principal means of heating the passenger compartment of both commercial and pleasure vehicles, heat rejection to the engine coolant in recently developed internal combustion engines has been reduced to the extent that the engine coolant is no longer a completely satisfactory source of heat for the passenger compartment. Therefore, the extremely high temperature present at the exhaust manifold now offers the most readily available source of heat for vehicle heating purposes. While the prior art is replete with exhaust heaters, heretofore such heaters have been considered relatively unsafe due to the constant danger of leakage of carbon monoxide and other toxic gases through the heating system into the passenger compartment.

An object of the present invention is to provide an exhaust manifold vehicle heating device having barrier means for preventing entrance of exhaust gases into the heating system.

Another object is to provide a cross-flow exhaust type vehicle heater having means providing optimum heat transfer.

A further object is to provide a device of the stated character having warning means adapted to indicate the occurrence of exhaust gas leakage from the exhaust chamber.

According to another feature of the invention, there is provided a unitary exhaust heater and engine muffler which assures considerably extended muffler service life and greatly reduces the difficulty of periodic replacement thereof.

These and other objects of the invention will become more fully apparent as reference is had to the appended specification and drawings wherein.

Figure 1:
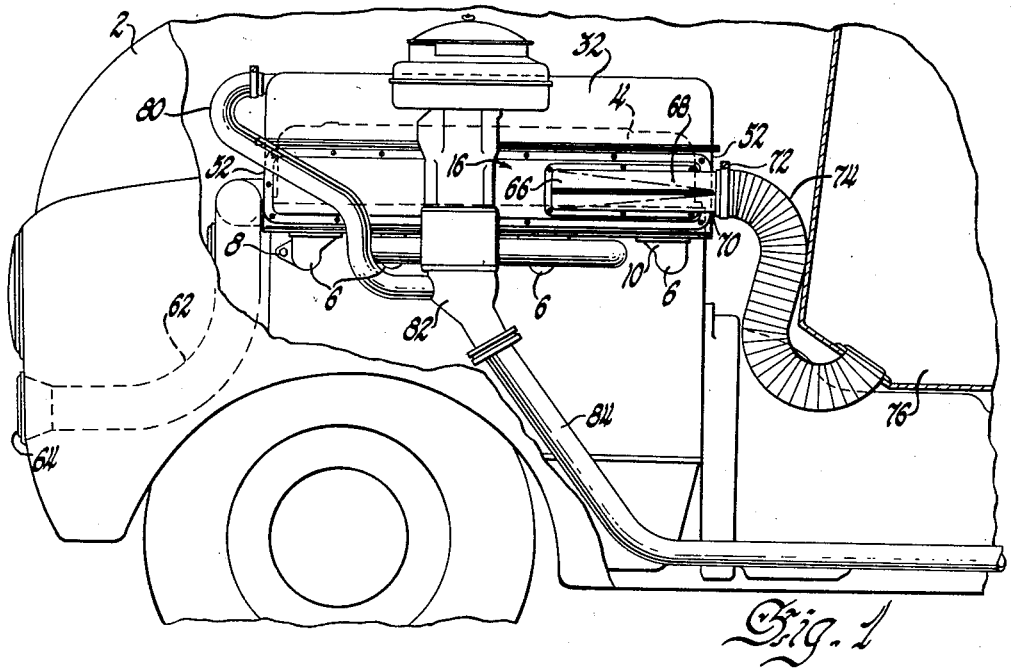
Fig. 1 is a fragmentary elevational view of a motor vehicle showing the form and arrangement of the heater and muffler assembly and its relationship to the vehicle engine.

Referring now to the drawings and more particularly Fig. 1, there is illustrated a portion of a motor vehicle 2 having an internal combustion engine 4 mounted in the conventional manner at the front end thereof. While engine 4 may be of any conventional type, the heater and muffler assembly presently to be described is particularly suitable for use with internal combustion engines providing very low heat rejection to the coolant. In the illustrated embodiment, the engine exhaust manifold consists of a plurality of flanged elbow-members 6 which are secured at longitudinally spaced intervals over the exhaust ports of the engine by means of bolts 8. Each of the vertically directed portions 10 of elbow-members 6 extends into and is secured in one of a series of longitudinally aligned flanged openings 12 formed in a rectangular horizontally disposed base plate 14 which supports a hollow box-like heater jacket 16. Secured adjacent the upper surface of plate 14, as by welding, is the bottom wall 18 of heater jacket 16. Wall 18 is provided with a plurality of longitudinally aligned laterally extending flanged slots 20 in which are secured the lower ends of a plurality of vertically directed flat exhaust gas tubes 22. At their upper ends, tubes 22 extend into a plurality of longitudinally aligned laterally extending flanged slots 24 formed in the upper wall 26 of heater jacket 16. As seen best in Fig. 3, walls 18 and 26 are longitudinally aligned and support tubes 22 in parallel spaced apart relation. Vertically adjacent wall 26 is an engine exhaust muffler casing 28, the base portion of which forms a rectangular longitudinally extending duct 30 providing common communication between the tubes 22 and the muffler 32 carried in the upper portion of the casing 28. At its lower peripheral edge, duct 30 is provided with an out-turned flange 34 which is adapted to register with the rectangular peripheral flange 36 of wall 26 and is secured thereto in gas-tight relation by means of machine screws 38. Inner and outer side walls 40 and 42, respectively, of heater jacket 16 are substantially similar in form to upper and lower walls 18 and 26 and are provided with a longitudinally spaced series of vertically extending flanged slots 44 and 46, respectively. Slots 44 and 46 of walls 40 and 42 are disposed in lateral alignment and are staggered longitudinally relative to slots 20 and 24 of walls 18 and 26. A plurality of cold air tubes 48 extend between aligned slots 44 and 46 and have their opposite ends secured therein. A pair of butt plates 50 and 52 cooperate with the forward and rearward marginal edges of walls 18, 26, 40 and 42 to completely enclose the interior of heater jacket 16. Laterally adjacent the inner wall 40 is a longitudinally extending cold air intake housing 54 having a rectangular flanged margin 56 which is secured against the marginal flange 58 of inner wall 40 to form a common chamber communicating with the plurality of tubes 48. Near its forward end, housing 54 is provided with a raised hollow portion 60 having a tubular air conduit 62 secured thereto. Conduit 62 extends forwardly of the engine 4 and is secured to a fresh air intake member 64. Laterally adjacent the outer side wall 42 and secured thereto, is a longitudinally extending relatively shallow rectangular discharge duct 66 providing common communication with the warm air side of tubes 48. Secured to and extending outwardly from the rear portion of duct 66 is a wedge-shaped housing 68 having a rearwardly directed cylindrical portion 70 which is adapted for connection by a clamping member 72 to suitable flexible tubing 74. While in the illustrated embodiment tubing 74 extends directly into the passenger compartment 76, it will be understood that the tubing may also be routed through any desired mixing controls, or the like, embodied in the ventilating system.

Figure 2:
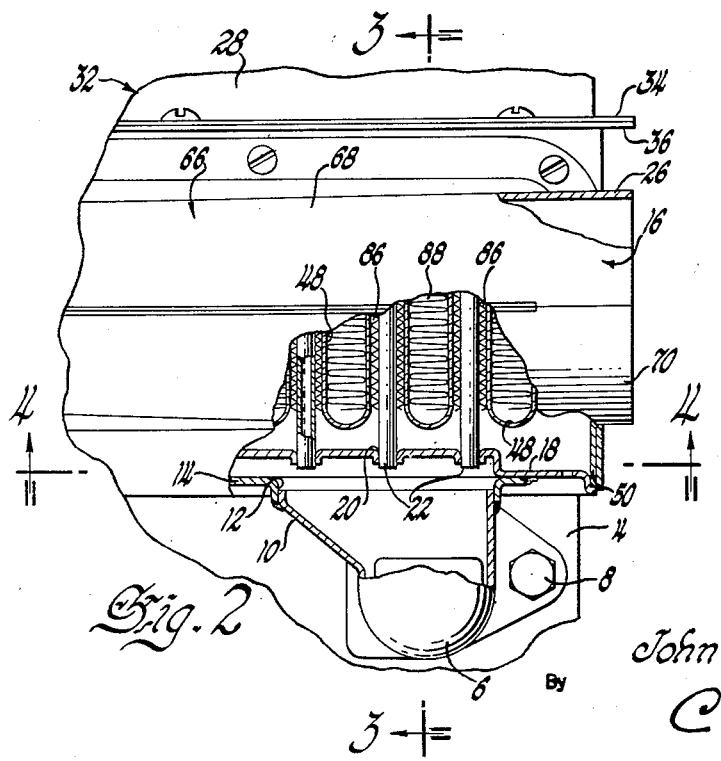
Fig. 2 is an enlarged fragmentary view of a portion of the heater assembly, certain parts being broken away to more clearly illustrate the construction thereof.
Figure 3:
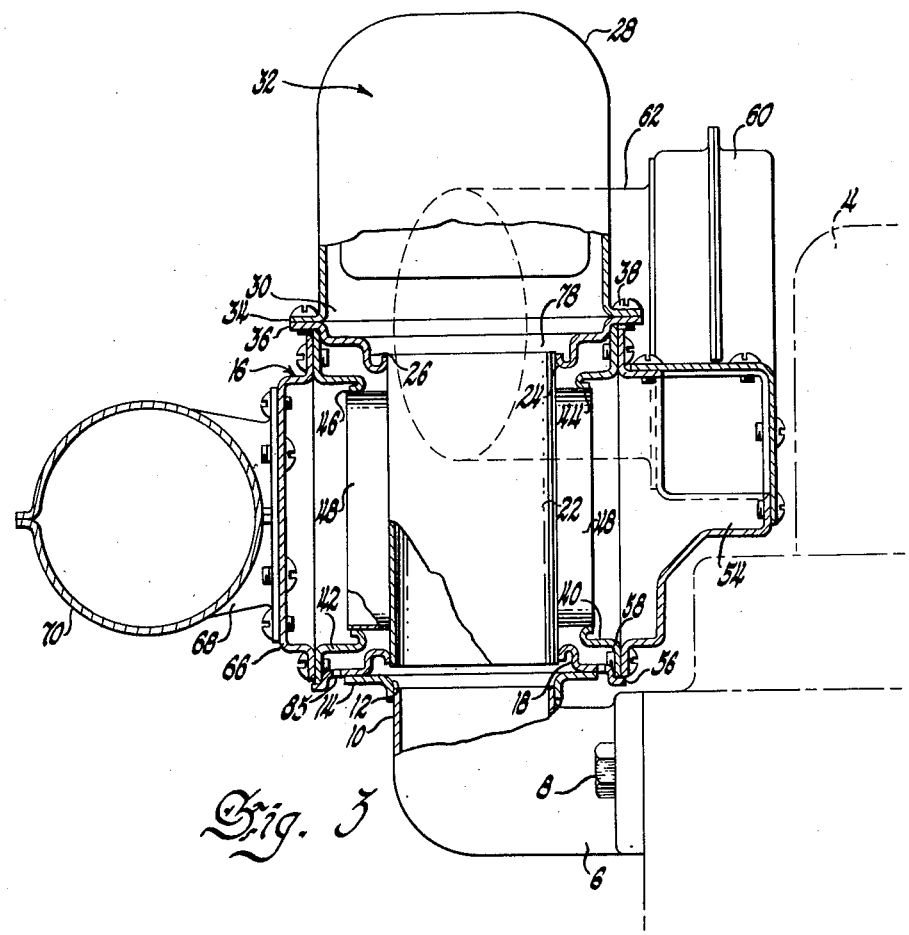
Fig. 3 is a rear elevational view, partly in section, viewed in the direction of arrows 3—3 of Fig. 2.
Figure 4:
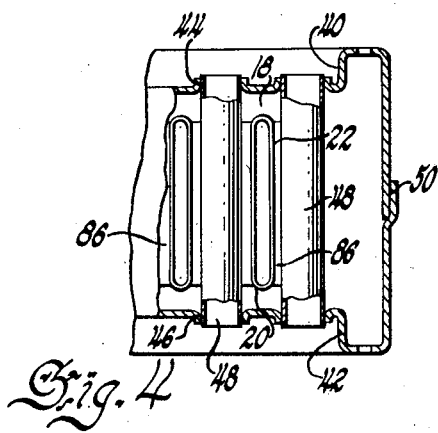
Fig. 4 is an enlarged fragmentary sectional view of a portion of the heater assembly viewed in the direction of arrows 4—4 of Fig. 2.

When assembled and mounted in the manner shown in Figs. 1, 2 and 3, it will be seen that the various walls and butt plates cooperate to provide a sealed box-like rectangular heater jacket 16 which completely encloses the cross-flow exhaust and cold air tubes. Hot exhaust gases travel through the plurality of vertically directed tubes 22 into the collector chamber 78 between wall 18 and muffler duct 30 and are discharged through the muffler 32 into the return exhaust pipe 80 connected at the forward end of muffler 32. From exhaust pipe 80, the gases enter the carburetor heat riser housing 82 and travel through the main exhaust pipe 84 to atmosphere. Simultaneously, cold outside air enters the fresh air intake 64, is conducted through air conduit 62 into intake housing 54, and is passed transversely through the laterally extending cold air tubes 48 disposed alternately between the vertically extending exhaust gas tubes 22. As cold air passes through tubes 48, it is warmed by conduction and is discharged into duct 66. From discharge duct 66, warm air is passed into the wedge-shaped housing 68 and may be routed by tubing 74 directly into the passenger compartment or through any conventional heating and ventilating system, not shown.

Since the individual walls of the exhaust gas tubes 22 and cold air tubes 48 are arranged in spaced relation, should a leak develop in any of the exhaust gas tubes, the gases will initially discharge into the closed interior of heater jacket 16 and, therefore, may not enter the cold air tubes and mix with the air passing through to the passenger compartment. In order to provide instant and audible indication of leakage or burn out in the exhaust gas tubes, heater jacket 16 is provided with a small vent hole 85. In the event of leakage from one of the exhaust gas tubes, pressure is built up within the heater jacket and produces an audible whistle as it escapes through vent hole 85. Thus, the operator is instantly and persistently warned of heater malfunction well in advance of any danger which may ultimately develop.

In order to provide optimum heat conduction between the spaced apart exhaust gas and cold air tubes, undulating ribbon-like metal centers 86 are thermally bonded between the respective tubes. To increase the rate of conduction between tubes 48 and the cold air passing therethrough, the interior of each of the tubes 48 is provided with undulating ribbon-like metal centers 88 similar to members 86. It will be apparent that the greatly increased interior surface area of tubes 48 will provide substantially improved heat conduction to the cold air.

As previously described, the engine exhaust muffler casing 30 is coupled directly to the upper longitudinally extending wall 18 of heater jacket 16 rather than being disposed along the exhaust pipe at a point midway of the vehicle. By coupling the muffler directly to a wall of the heater jacket, the construction of the heater is materially simplified and the service life of the muffler considerably extended due to the more protected location. In addition, when periodic replacement is required, the muffler is completely accessible and is much more easily dismounted than has been heretofore possible. Further, as a result of extensive tests, it has been found that considerably reduced passenger compartment noise level results when the muffler is located immediately adjacent the exhaust manifold.

From the foregoing, it will be seen that a novel and simplified unitary heater and muffler construction has been devised. The construction provides a heating device of optimum efficiency, greatly improved safety characteristics, and adequate advance warning should a malfunction ultimately occur. In addition, by virtue of the muffler location, noise level in the passenger compartment is appreciably reduced.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:

1. A heat exchanger comprising a closed casing having alternating vertical and horizontal fluid conducting tubes extending therethrough, and means on said casing adapted to produce an audible signal in the event one of said tubes is ruptured.

2. A heat exchanger comprising a closed casing having alternating vertical and horizontal fluid conducting tubes extending therethrough in spaced apart relation and opening outwardly thereof, one of said sets of tubes being adapted to carry hot gases, and means forming an opening in said casing, said opening being adapted to produce audible warning upon escape of said gases into the interior of said casing.

3. A heat exchanger comprising a closed casing having spaced apart alternating vertically and horizontally directed fluid conducting tubes extending therethrough, undulating conductor means disposed between said tubes, and signal means on said casing adapted to indicate leakage of fluid from said tubes into said casing.

4. A heat exchanger comprising a closed casing having alternating vertical and horizontal passages extending therethrough, said passages being longitudinally spaced apart, conductor means bridging the spaces between said tubes, and additional conductor means disposed interiorly of said horizontally directed passages.

5. A heat exchanger comprising a closed casing, a first set of spaced apart vertical passages, a second set of spaced apart horizontal passages, said first and second sets of passages being alternately disposed in longitudinally aligned spaced apart relation, undulating conductor means bridging the spaces between said tubes, and additional conductor means disposed interiorly of one of said sets of tubes.

6. An exhaust manifold heat exchanger comprising a closed casing, a cold air duct formed on said casing, alternating vertically and horizontally directed sets of fluid conducting tubes extending through said casing in spaced apart relation and opening outwardly thereof, one of said sets of tubes being adapted to communicate with said exhaust manifold, the other of said sets of tubes being adapted to communicate with said cold air duct, undulating centers disposed between the opposed surfaces of said tubes, and pressure responsive means in said casing for indicating leakage in said tubes communicating with said manifold.

References Cited in the file of this patent

UNITED STATES PATENTS

| | | |
|---|---|---|
| 718,851 | Lamplough | Jan. 20, 1903 |
| 1,571,068 | Stancliffe | Jan. 26, 1926 |
| 1,745,492 | Kelch et al. | Feb. 4, 1930 |
| 1,936,698 | Vincent | Nov. 28, 1933 |
| 2,412,334 | Hoesel | Dec. 10, 1946 |
| 2,469,028 | Belaieff | May 3, 1949 |

FOREIGN PATENTS

| | | |
|---|---|---|
| 110,394 | Germany | Apr. 28, 1900 |